H. SIMPSON.
CAR FENDER.
APPLICATION FILED JAN. 22, 1909.
936,953.
Patented Oct. 12, 1909.
2 SHEETS—SHEET 1.
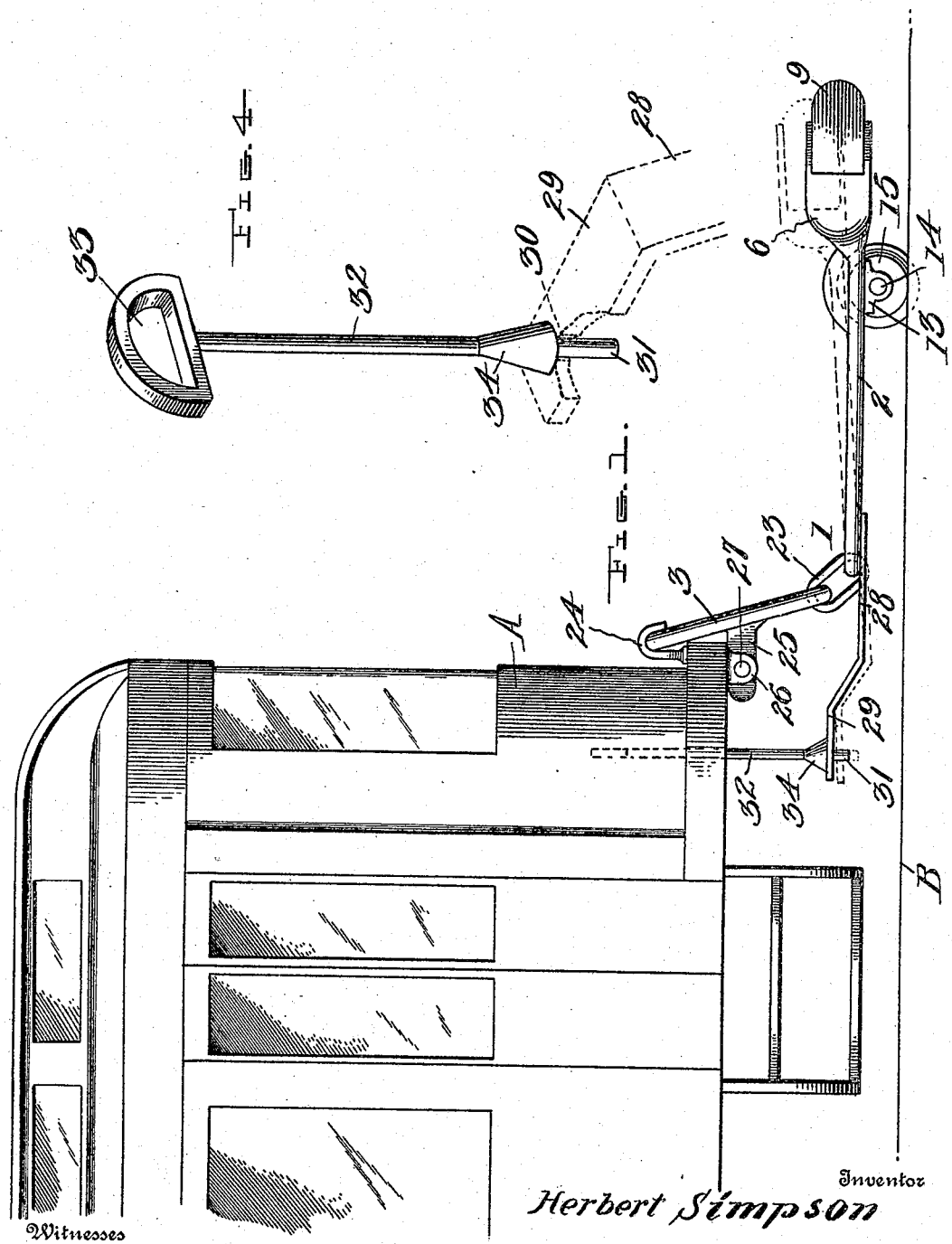
Witnesses
K. Allen
James T. Noell
Inventor
Herbert Simpson
By Victor J. Evans
Attorney H. SIMPSON.
CAR FENDER.
APPLICATION FILED JAN. 22, 1909.
936,953.
Patented Oct. 12, 1909.
2 SHEETS—SHEET 2.
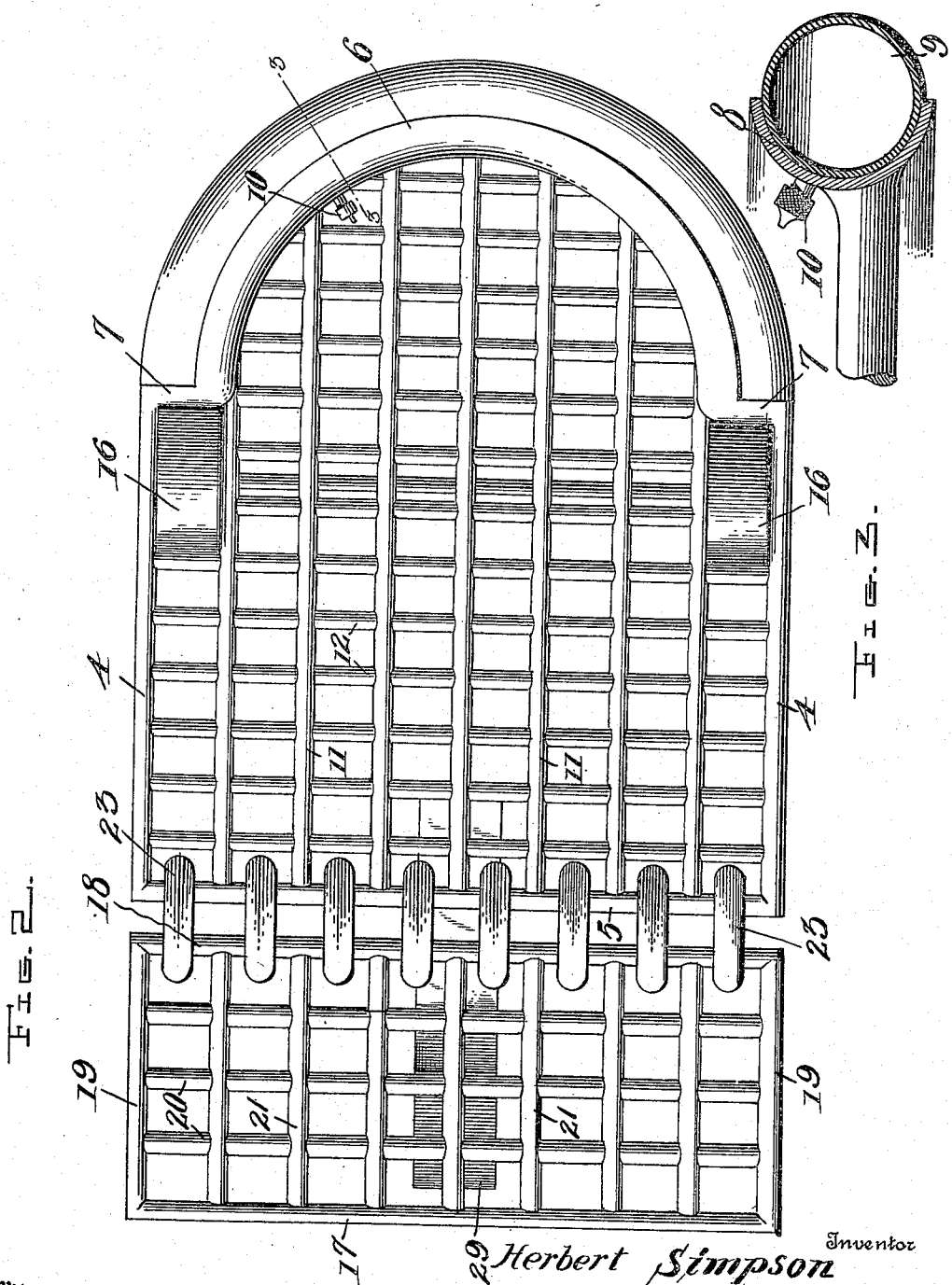

UNITED STATES PATENT OFFICE.

HERBERT SIMPSON, OF LOWELL, MASSACHUSETTS.

CAR-FENDER.

936,953.  Specification of Letters Patent.  Patented Oct. 12, 1909.

Application filed January 22, 1909. Serial No. 473,735.

*To all whom it may concern:*

Be it known that I, HERBERT SIMPSON, a citizen of the United States, residing at Lowell, in the county of Middlesex and State of Massachusetts, have invented new and useful Improvements in Car-Fenders, of which the following is a specification.

This invention relates to car fenders, and more particularly to those adapted for use particularly upon electric surface cars, and has for an object to provide a fender which, when in use, will assume a position in close proximity to the car track.

A further object of this invention is to provide a fender with a wheeled axle, the wheels of which travel the car tracks and support the fender in parallel relation with respect to said tracks.

A further object of the present invention is to provide a fender consisting of loosely connected elements, one of which is movable in a vertical plane toward or away from the track so that the supporting wheels can be disengaged from the track when a car is taking curves or the like.

A further object of this invention is to provide a fender with a pneumatic cushion at the front end which obviates serious injury to a person when struck.

Other objects and advantages will be apparent as the nature of the invention is better set forth, and it will be understood that changes within the scope of the claim may be resorted to without departing from the spirit of the invention.

In the drawings, forming a portion of this specification and in which like characters of reference indicate similar parts in the several views:—Figure 1 is a side view of a portion of a car showing my improved fender applied thereto. Fig. 2 is a top plan view of the fender. Fig. 3 is a detail section taken on the line 3—3 of Fig. 2. Fig. 4 is a perspective view of the foot operated lever for raising the fender above the tracks.

Referring now more particularly to the drawings, there is shown a car A of well known construction adapted to travel upon tracks B as usual.

The fender is indicated at 1 and comprises an element 2, and a guard member 3. The element 2 is preferably formed of metal and comprises parallel side bars 4, a rear end bar 5, and a front member 6 connected to the side bars 4 at their front ends by offset portions 7. The member 6 is of arcuate form and is provided with an arcuate concavity 8 in which is seated a pneumatic cushion 9 preferably in the form of a single tube tire provided with an inflating valve 10. The cushion 9 is secured in the concavity by means of cement or the like. Longitudinally extending bars or rods 11 connect the member 6 with the bar 5 as clearly shown in Fig. 2 of the drawings, and similar bars or rods 12 extend transversely of the bars or rods 11 and are connected at their ends to the bars 4 and to portions of the member 6 respectively. The element 2 is provided adjacent to the member 6 with depending boxes 13 which receive a horizontally disposed transverse shaft 14 provided with wheels 15 to travel upon the tracks B. The element 2 is provided with suitable housings or guards 16 which extend over the wheels 15 to prevent a person coming in contact with said wheels as will be readily understood.

The guard member 3 is similar in construction to the element 2 and comprises a rear bar 17, a front bar 18, and connecting end bars 19. The bars 19 are connected by longitudinally extending parallel spaced bars 20, and the bars 17 and 18 are connected by bars 21. It will thus be seen that a strong and durable structure is provided which may be formed of suitable metal and produced at a minimum expense. To provide a loose joint between the guard member 3 and the element 2 of the fender I provide elongated links 23 which are engaged with the bars 5 and 18 respectively.

The car A is provided at the front end thereof with a hook shaped element 24 which receives, when the fender is in an operative position, the bar 17 of the guard member 3. The guard member is provided with ears 25 disposed between ears 26 which depend from the platform of the car at the front end, and as shown, these ears 25 and 26 receive a transversely disposed shaft 27. When the fender is in an operative position, it will be seen that the guard member 3 lies approximately at an obtuse angle to the element 2, and by providing the wheels 15 upon the axle 14 it is obvious that the element 2 lies approximately in parallel relation with respect to the tracks B.

The element 2 of the fender is provided with a rearwardly directed plate 28 having an offset portion 29 in which is formed an aperture 30 for receiving the lower depending reduced portion 31 of a foot operated lever 32 which extends through the platform of the car and which is provided at its upper end with a yoke 33 to receive the foot of the motorman so that the lever 32 can be depressed and moved downwardly to elevate the element 2 of the fender as shown in dotted lines in Fig. 1 of the drawings. I preferably provide the rod 32 with a substantially conical shaped stop 34 disposed directly above the reduced portion 31 and adapted to rest upon the offset portion 29 of the plate to limit the downward movement of said lever.

When the fender is not in use it may be folded so that the guard 3 rests upon the element 2, and the entire device may be suitably stored beneath the car.

It will be readily appreciated that I provide an extremely simple and useful car fender which may be applied to all forms of cars.

I claim:—

The combination with a car, of an angularly disposed guard at the front end thereof, an element forwardly of the guard, links connecting the element with the guard so that the former is free for pivotal movement in a vertical plane, track engaging wheels carried by the element, a plate carried by the element and extending rearwardly therefrom, said plate having a portion disposed beneath the platform of the car, and a lever operatively connected with the plate.

In testimony whereof I affix my signature in presence of two witnesses.

HERBERT SIMPSON.

Witnesses:
 ARCHIE G. McLOON,
 Mrs. L. M. WHITEHEAD.